G. Clump,
Relieving Choked Animals,
Nº 76,998.        Patented Apr. 21, 1868.
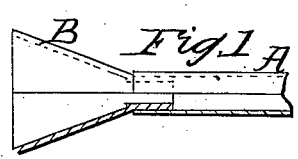
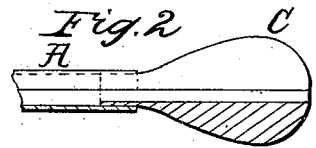
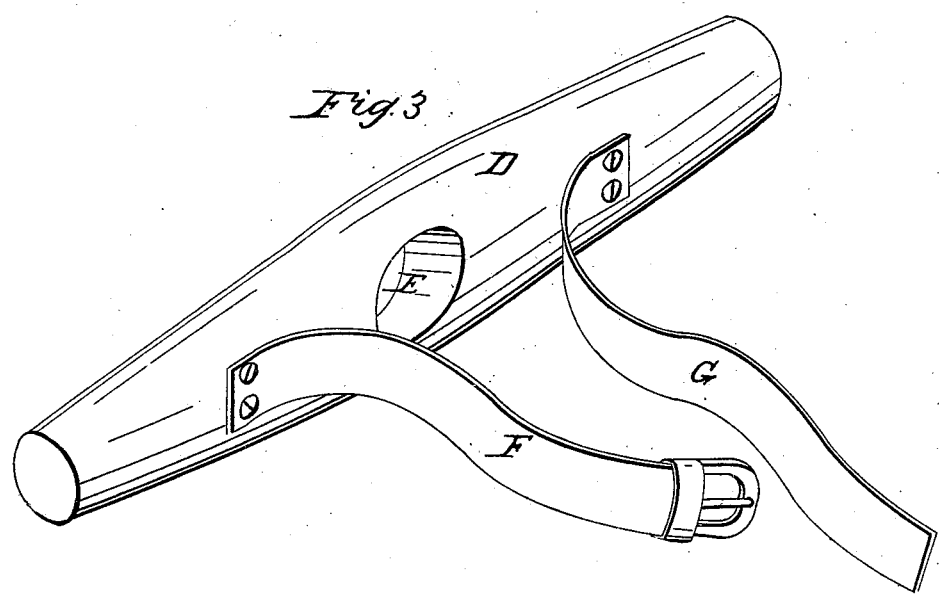
Witnesses:
Inventor:
George Clump
By his Attorney
John E. Earl

United States Patent Office.

GEORGE CLUMP, OF HAMDEN, ASSIGNOR TO HIMSELF AND WILLIAM ENERLE, OF NEW HAVEN, CONNECTICUT.

Letters Patent No. 76,998, dated April 21, 1868.

APPARATUS FOR RELIEVING CHOKED ANIMALS.

*The Schedule referred to in these Letters Patent and making part of the same.*

TO ALL WHOM IT MAY CONCERN:

Be it known that I, GEORGE CLUMP, of Hamden, in the county of New Haven, and State of Connecticut, have invented a new Apparatus for Relieving Choked Animals; and I do hereby declare the following, when taken in connection with the accompanying drawings, and the letters of reference marked thereon, to be a full, clear, and exact description of the same, and which said drawings constitute part of this specification, and represent, in—

Figure 1, an end view of the apparatus,
Figure 2 the other end, and in
Figure 3 the bar to open the mouth of the animal.

The object of this invention is to remove, from the throat of cattle, vegetable or other substances which may have lodged therein, and also to relieve the animal when in condition commonly called "load up," that is to say, when the animal has eaten a quantity of material which creates a quantity of gas in the stomach; and the invention consists in a flexible tube, provided at one end with a funnel-shaped mouth, which is employed to force any substance which has lodged in the throat into the stomach, and at the other end with a perforated bulb for insertion into the stomach, so as to permit the gas in the stomach to pass out through the tube.

In order to the clear understanding of my invention, I will fully describe the same as illustrated in the accompanying drawings.

A is a tube, of any required length, and made flexible, and yet so as to retain its form, which is done by the insertion of a spiral wire winding within the tube. At one end of the said tube is fixed a funnel-shaped mouth, B, opening from the tube; at the other end a perforated bulb, C, the perforation also opening into the tube A. This completes the instrument. Its manner of use is as follows:

D is a bar of wood, or other suitable material, having a hole, E, through it of sufficient size to permit the end, B or C, of the tube to pass freely through. This bar is placed between the jaws of the animal, and secured therein by straps, F and G, passed over the head. Thus arranged to hold open the mouth of the animal when choked by the lodgment of any substance in its throat, insert the open mouth B through the opening E in the bar D, pass it gently down the throat of the animal. The mouth B, striking the substance, will force it down into the stomach, and thus afford immediate relief.

If the animal is in condition commonly called "load up," arrange the bar D in the same manner, and insert the bulb C, passing it down into the stomach, where the gas is confined, the passage through the tube forming an exit for the gas, which affords the animal immediate relief.

When used for the last-named purpose, particles of food may enter the tube, and to prevent its being clogged, I provide the instrument with a rod, which will pass freely through the tube; and, by the use of this rod, if the tube be clogged, I force whatever substance may enter the tube back into the stomach.

I have illustrated and described my invention as a single tube, having the instrument B at one end, and C at the other, and this I prefer, as it requires but a single instrument to relieve the animal in either condition, yet, if desired, a separate tube for each of the devices B and C may be employed.

Having thus fully described my invention, what I claim as new and useful, and desire to secure by Letters Patent, is—

The herein-described apparatus, consisting of the tube A, provided at one end with the mouth B or bulb C, or with one at each end of the tube, so as to operate substantially in the manner and for the purpose herein described.

GEORGE CLUMP.

Witnesses:
  A. J. TIBBITS,
  J. H. SHUMWAY.